Feb. 14, 1956

R. J. McCURDY

TIME-BASE GENERATOR

Filed Jan. 24, 1952

2,735,007

INVENTOR

Robert J. McCurdy

BY Morris A. Laskin

ATTORNEY

United States Patent Office 2,735,007

Patented Feb. 14, 1956

2,735,007

TIME-BASE GENERATOR

Robert J. McCurdy, Bridgeboro, N. J., assignor to Radio Corporation of America, a corporation of Delaware Application January 24, 1952, Serial No. 268,024

9 Claims. (Cl. 250—27)

This invention relates to electronic sweep generators and, in particular, to an improved linear or square-law time-base generator.

A time-base generator is one which has an output which is a specified function of time. A device of this type which is frequently used in radar and television scanning circuits is the saw-tooth generator. A conventional saw-tooth generator uses a resistance-capacitance network to generate the desired saw-tooth output. Where a linear output is desired, the circuit must include some means to compensate for the natural exponential characteristic of the resistance-capacitance network. Many kinds of compensating circuits are known. Few circuits, however, have been designed to give overcompensation, where overcompensation means the addition to the exponential characteristic of more than is required to give a linear output. Where overcompensation, as well as compensation, is possible a considerably greater number of time bases can be generated including exponential, linear and power functions of time. A circuit which is capable of generating many functions of time is very desirable since its versatility adapts it to a wide variety of systems.

It is an object of the present invention, therefore, to provide a simple time-base generator which is capable of overcompensation as well as compensation.

A further object of the present invention is to provide an improved time-base generator which is capable of producing a wide variety of time bases.

A still further object of the present invention is to provide a novel and improved linear saw-tooth generator.

A further object of the present invention is to provide a novel and improved square-law, saw-tooth generator.

These and further objects of the present invention are achieved by utilizing a capacitor charging network having a first resistor and a first capacitor, an integrating network having a second resistor and a second capacitor, and a cathode-follower feed-back stage having an electron discharge tube. The junction of the first resistor and first capacitor is connected to the second resistor. The junction of the second resistor and second capacitor provides an output proportional to the integral of the voltage across the first capacitor. This junction is coupled to the grid of the cathode-follower tube. A positive feed-back is derived from the cathode of the cathode-follower tube and is applied to the first capacitor. As a result of the above connections, the total voltage across the series combination of the first capacitor and the cathode load resistor of the cathode-follower tube is equal to the voltage across the first capacitor plus a constant times its integral. A linear time base may be obtained from the junction of the first resistor and the first capacitor or a square-law time base may be derived from the cathode of the cathode-follower tube.

In accordance with a preferred embodiment of the invention, where it is used as a saw-tooth generator, a diode is connected in shunt across the resistor in the integrating network. A rectangular pulse input is provided and coupled to the junction of the first resistor and first capacitor. The duration of the rectangular pulse determines the duration of the saw-tooth output. A linear saw-tooth output may be derived from the junction of the first resistor and the first capacitor.

The novel features of the invention as well as the invention itself, both as to its organization and method of operation will best be understood from the following description, when read in connection with the accompanying drawings in which.

Figure 1:
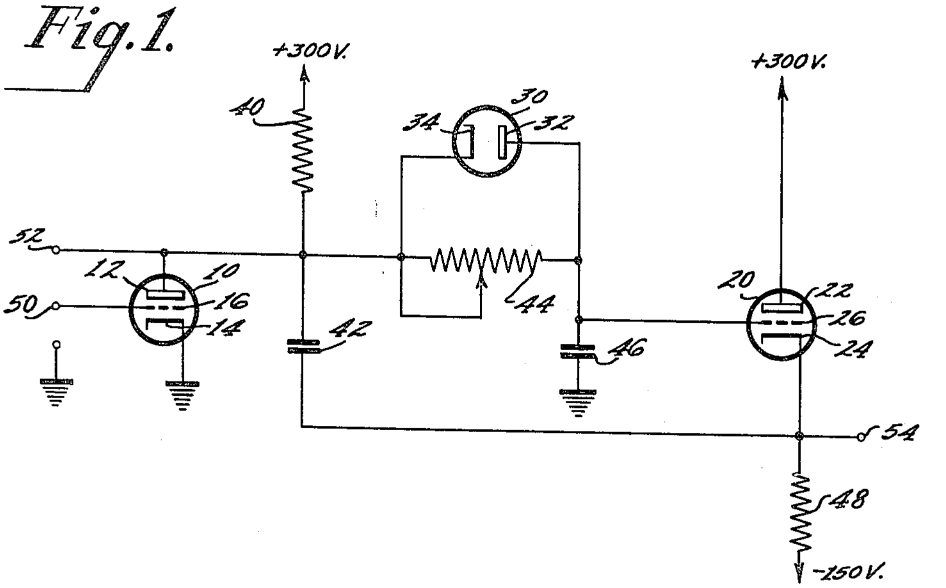
Figure 1 shows a circuit diagram of an embodiment of the present invention.

Referring now to Figure 1, there may be seen a first electron discharge tube 10 which has its anode 12 connected to the junction of a first resistor 40 and a first capacitor 42 and also to a variable resistor 44. A second electron discharge tube 20 has its grid 26 connected to the junction of the variable resistor 44 and a second capacitor 46. The cathode 24 of the second tube 20 is connected to a cathode load resistor 48 and also to the first capacitor 42. A diode 30 is connected in shunt across the variable resistor 44 with its anode 32 connected to the junction of the variable resistor 44 and the second capacitor 46 and its cathode connected to the junction of the first resistor 40 and the first capacitor 42. A suitable source of potential is provided and connected to the first resistor 40, the anode 22 of the second tube 20 and the cathode load resistor 48 of the second tube 20. An input terminal 50 is connected to the grid 16 of the first tube 10. First and second output terminals 52 and 54 are respectively connected to the anode 12 of the first tube 10 and the cathode 24 of the second tube 20.

Figure 2:
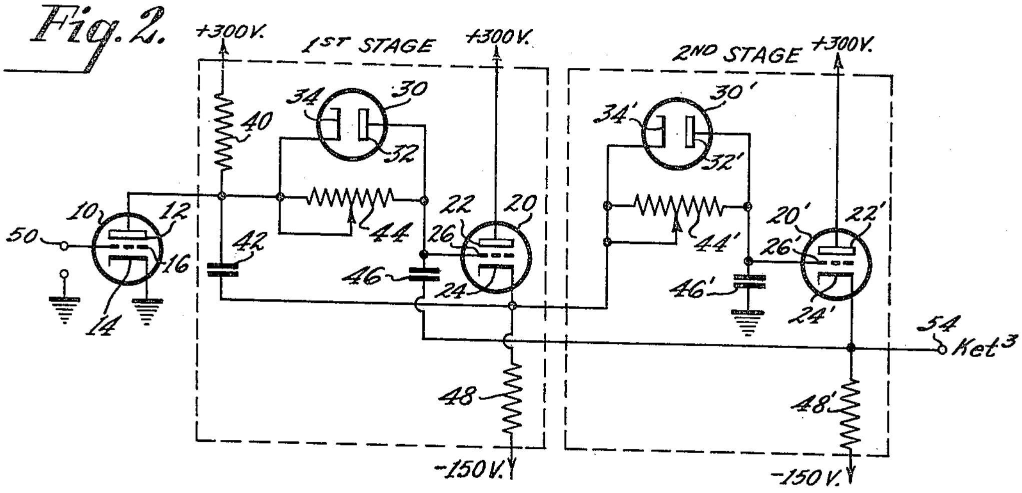
Figure 2 shows a circuit diagram of a second embodiment of the present invention which extends the principles illustrated in Figure 1 to a two-stage circuit.
Figure 3:
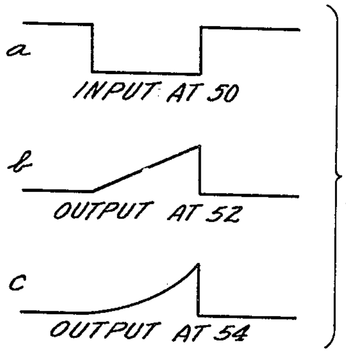
Figure 3 is a diagram of the wave forms which occur during the operation of the embodiment shown in Figure 1.

With these connections the first tube 10 is normally conducting. A negative pulse such as is shown in Figure 2 is applied to the input terminal 50. This causes a sudden non-conduction of the first tube 10 and causes its anode potential to rise. The first capacitor 42 begins to charge according to an exponential function $e_c$. This may be approximately represented as:

$$e_c=E(1-e^{-t/RC})$$

where E is equal to the voltage applied to the first resistor 40, R is the resistance of the first resistor 40 and C is the capacitance of the first capacitor 42. The exponential function above may be found on page 12 of a book by O. S. Puckle published by John Wiley and Sons, entitled "Time Bases." As the voltage $e_c$ across the first capacitor rises according to the exponential function above the voltage across the second condenser 46 and the voltage at the cathode 24 of the second tube rise in proportion to the integral of the voltage across the first capacitor. The voltage $e_{54}$ at the cathode of the second tube and the second output terminal 54 may be approximately represented as:

$$e_{54}=K\int_0^t E(1-e^{-t/RC})dt$$

or:

$$e_{54}=KEt-KERC(1-e^{-t/RC})$$

where K is a constant determined by the values of the variable resistor 44, second capacitor 46 and the ratio of the cathode-output to grid-input of the second tube 20. The voltage $e_{52}$ appearing at the first output terminal 52 during the input pulse duration equals the voltage $e_c$ across the first capacitor plus the voltage $e_{54}$ across the cathode load resistor 48 of the second tube 20. Expressed mathematically this is:

$$(1)\quad e_{52}=e_c+e_{54}=E(1-e^{-t/RC})+K\int_0^t E(1-e^{-t/RC})dt$$

or $$(2)\quad e_{52}=E(1-e^{-t/RC})-KERC(1-e^{-t/RC})+KEt$$

If a linear voltage output is desired at the first terminal such as is shown in the solid line graph of Figure 2, then the expression (2) above must be equal to KE$t$ which is the mathematical expression for a straight line. This is possible if: $E(1-e^{-t/RC})-KERC(1-e^{-t/RC})$ is equal to zero or if K is equal to $$\frac{1}{RC}$$

Thus, if a linear output at the first terminal is desired, the variable resistor must be adjusted so that K equals $$\frac{1}{RC}$$

This point is established by adjusting the variable resistor until the output at the first terminal 52 is linear. The linearity of the output can be determined, for example, by observing the wave form of an oscilloscope.

In order to insure that the variable resistor-second capacitor network provides a true integral of the voltage applied to it, the time constant product of its resistance and capacitance must be large with respect to the duration of the rectangular pulse input.

The time constant product of the resistance of the first resistor and capacitance of the first capacitor need not be greater than the duration of the rectangular pulse unless a square-law output is desired at the cathode of the second tube. When the time constant product is made large with respect to the input pulse duration the voltage across the first capacitor appears substantially linear during its charging. Since the voltage at the cathode of the second tube is proportional to the integral of the voltage across the first capacitor, it will have the waveshape of a square-law curve which is the integral of the linear function across the first capacitor. The rate of rise of the square-law output at the cathode of the second tube can be varied by varying the variable resistor or otherwise varying the value of K.

An output voltage having a higher power rise characteristic can be derived, utilizing the principles illustrated, by connecting several of the indicated charging-integrating stages in cascade. An arrangement for providing an output proportional to time cubed ($t^3$) is shown in Figure 2. The first stage is identical to that shown in Figure 1 except that the second capacitor 46 of the first stage is not connected to ground but is connected as explained below.

The second stage includes an integrating circuit and a cathode-follower circuit similar to that shown in Figure 1 and the first stage of Figure 2. Where similar components are used in the first and second stages of Figure 2, the same reference numerals are used but are primed for components of the second stage. The second capacitor 46 of the first stage serves both as an integrating capacitor for that stage and as a charging capacitor for the second stage. The cathode of the cathode-follower tube 20 of the first stage is connected to the variable integrating resistor 44′ of the second stage. The integrating capacitor 46 of the first stage is connected to the cathode of the cathode-follower tube 20′ of the second stage.

The pulsing circuit utilized includes tube 10 and is similar to that shown in Figure 1. The time constant of the charging network of the first stage is made large with respect to the input pulse duration. As a result, the voltage which appears at the cathode of the cathode-follower tube 20 of the first stage is a square law function. This serves as the input to the second stage and the second stage integrates this function and provides a function of time cubed ($t^3$).

A diode 30 is connected in shunt across the variable resistor 44 when a saw-tooth output is desired. The diode conducts when the first tube 10 is rendered conductive at the termination of the rectangular pulse. The conduction of the diode provides a low impedance discharge path for the first and second capacitors 42 and 46. This gives the desired high-speed return to the initial condition of the circuit in preparation for the next rectangular trigger pulse:

In an operative embodiment of the invention shown in Figure 1, the following values for the components are used. These values are given for purposes of illustration only, and are not to be construed as limiting the invention thereto.

Tube 10 is a triode section of type 12AU7
Tube 20 is a triode section of type 12AT7
Tube 30 is type 6AL5
Resistor 40 is 2 megohms
Resistor 44 is 5 megohms
Resistor 48 is 47,000 ohms
Capacitor 42 is 68,000 $\mu\mu$f
Capacitor 46 is 1,000 $\mu\mu$f From the foregoing description, it will be readily apparent that the present invention provides an improved time-base generator which is capable of providing a wide variety of time bases.

What is claimed is:

1. A time-base generator comprising a capacitor charging circuit, means for applying a pulse having a predetermined duration to said capacitor charging circuit, integrating means connected to said charging circuit to derive an output which is proportional to the integral of the voltage appearing at the output of said capacitor charging circuit during the duration of said applied pulse, and means for adding said integral voltage to the voltage appearing at the output of said capacitor charging circuit including an electron discharge tube having at least a cathode, an anode, and a control grid, the output of said integrating circuit being connected to the grid of said tube and the cathode of said tube being connected to said capacitor charging circuit, and means for applying a source of operating potential to said anode.

2. A time-base generator comprising a capacitor charging circuit having a first resistor and a first capacitor connected in series, means for applying a rectangular voltage to the junction of said first resistor and said first capacitor, an integrating circuit having a second resistor and a second capacitor connected in series, a connection between said second resistor and the junction of said first resistor and said first capacitor, an electron discharge tube having at least a cathode, an anode, and a control grid, a connection between the junction of said second resistor and said second capacitor and the control grid of said tube, a cathode load resistor coupled to the cathode of said tube, and means for deriving output voltages from the junction of said first resistor and said first capacitor and from the cathode of said tube, and means for connecting operating voltages to said first resistor, said anode and said cathode load resistor.

3. A time-base generator comprising a first and a second electron discharge tube each having at least a cathode, an anode, and a control grid, a capacitor charging circuit including a first resistor and a first capacitor connected to said resistor, an integrating circuit including a second resistor and a second capacitor connected to said second resistor, the junction between said first resistor and said first capacitor being connected to the anode of said first tube and to said second resistor, the junction between said second resistor and said second capacitor being connected to the control grid of said second tube, a cathode load resistor connected to the cathode of said second tube, a connection between said first capacitor and the cathode of said second tube, means for applying a rectangular pulse having a predetermined width to the control grid of said first tube, means for deriving an output from the anode of said first tube and from the cathode of said second tube, and means for applying operating potentials to said first resistor, the anode of said second tube, and said cathode resistor.

4. A linear time-base generator comprising a capacitor charging circuit having a first resistor and a first capacitor, an integrating circuit having a variable resistor and a second capacitor, a first and a second electron discharge tube each having at least a cathode, an anode, and a control grid, a first junction between said first resistor and said first capacitor, said first junction being connected to the anode of said first tube and to said second resistor, a second junction between said variable resistor and said second capacitor, a connection between said second junction and the control grid of said second tube, a cathode load resistor connected to the cathode of said second tube, a connection between the cathode of said second tube and said first capacitor, means to apply a rectangular pulse to the control grid of said first tube, means to preadjust said variable resistor such that throughout the duration of said rectangular pulse the output at the cathode of said second tube varies with respect to time as the integral of the voltage across said first condenser multiplied by a constant substantially equal to the reciprocal of the product of the resistance of said first resistor and the capacitance of said first capacitor, means to derive an output at the anode of said first tube which is substantially linear with respect to time, and means to apply operating potentials to said first resistor, said anode of said second tube, and said cathode load resistor.

5. A square-law saw-tooth generator comprising a first and a second electron discharge tube each having at least a cathode, an anode, and a control grid, a third electron discharge tube having an anode and a cathode, a first resistor and a first capacitor each having one end connected to the anode of said first tube and to the cathode of said third tube, said first capacitor having its other end connected to the cathode of said second tube, a variable resistor and a second capacitor each having one end connected to the grid of said second tube and to the anode of said third tube, said variable resistor having its other end connected to the anode of said first tube and to the cathode of said third tube, a cathode load resistor connected to the cathode of said second tube, means to apply a rectangular pulse to the grid of said first tube, the duration of said rectangular pulse being less than the time constant product of the resistance of said first resistor and the capacitance of said first capacitor, means to derive an output from the cathode of said second tube, and means for applying operating potentials to said first resistor, said anode of said second tube, and said cathode resistor.

6. A linear saw-tooth generator comprising a first and a second electron discharge tube each having at least a cathode, an anode, and a control grid, a third electron discharge tube having an anode and a cathode, a first resistor and a first capacitor each having one end connected to the anode of said first tube and to the cathode of said third tube, said first capacitor having its other end connected to the cathode of said second tube, a variable resistor and a second capacitor each having one end connected to the grid of said second tube and to the anode of said third tube, said variable resistor having its other end connected to the anode of said first tube and to the cathode of said third tube, a cathode load resistor connected to the cathode of said second tube, means to apply a rectangular pulse of suitable magnitude and polarity to the grid of said first tube, means to preadjust the resistance of said variable resistor such that the voltage at the anode of said first tube varies as a linear function of time during the application of said rectangular pulse, means to derive output from the anode of said first tube, and means for applying operating potentials to said first resistor, said anode of said second tube, and said cathode resistor.

7. A time-base generator comprising a first stage including a capacitor charging circuit having a first resistor and a first capacitor connected to said first resistor, an integrating circuit having a second resistor and a second capacitor connected to said second resistor, said second resistor being connected to the junction of said first resistor and said first capacitor, a first electron discharge tube having at least a cathode, an anode and a control grid, a connection between the junction of said second resistor and said second capacitor and the control grid of said tube, a first cathode load resistor coupled to the cathode of said tube, a connection between the cathode of said tube and said first capacitor; a second stage including an integrating circuit having a third resistor and a third capacitor connected to said third resistor, a second electron discharge tube having at least a cathode, an anode, and a control grid, a connection between the junction of said third resistor and said third capacitor and the grid of said second tube, a second cathode load resistor connected to the cathode of said second tube; a connection between the cathode of said first tube and said third resistor, a connection between the cathode of said second tube and said second capacitor, means for applying rectangular pulses to said capacitor charging circuit, means for deriving an output from the cathode of said second tube, and means for applying operating potentials to said first resistor, the anodes of said first and said second tubes, and said first and said second cathode load resistors.

8. A time-base generator comprising a first stage including a capacitor charging circuit having a first resistor and a first capacitor connected to said first resistor, an integrating circuit having a second resistor and a second capacitor connected to said second resistor, said second resistor being connected to the junction of said first resistor and said first capacitor, a first electron discharge tube having at least a cathode, an anode and a control grid, a connection between the junction of said second resistor and said second capacitor and the grid of said tube, a cathode load resistor coupled to the cathode of said tube, a connection between the cathode of said tube and said first capacitor; a plurality of cascaded stages each of said stages including an integrating circuit and an electron discharge tube having at least a cathode, an anode, and a control grid, a coupling between the cathode of said first tube and the integrating circuit of the first of said cascaded stages, a coupling between the cathode of said tube in the first of said cascaded stages and said second capacitor, a connection between the cathode of the tube in each of said plurality of cascaded stages and the input of the integrating circuit of the succeeding one of said plurality, a coupling between the output of the integrating circuit in each one of said plurality of stages and the cathode of the tube in the succeeding one of said plurality of stages, means for deriving an output from the cathode of the tube in the last one of said cascaded stages, and means for applying operating potentials to the anode of each of said tubes, to said cathodes, and to said first resistor.

9. A time-base generator as recited in claim 8 wherein said integrating circuit in each one of said plurality of stages includes a resistor and a capacitor connected to said resistor, the junction of said capacitor and resistor being connected to the grid of said tube in that stage, and a cathode load resistor connected to the cathode of said last mentioned tube.

References Cited in the file of this patent

UNITED STATES PATENTS

| | | |
|---|---|---|
| 2,232,076 | Newsam | Feb. 18, 1941 |
| 2,412,063 | Rosentreter | Dec. 3, 1946 |
| 2,426,256 | Zenor | Aug. 26, 1947 |
| 2,462,024 | Johnson | Feb. 15, 1949 |
| 2,562,295 | Chance | July 31, 1951 |
| 2,574,437 | Reed, Jr. | Nov. 6, 1951 |
| 2,606,287 | McCoy | Aug. 5, 1952 |
| 2,621,292 | White | Dec. 9, 1952 |